United States Patent
Widstrand

[15] 3,671,790
[45] June 20, 1972

[54] LOW-SHAFT, LOW-PROFILE ELECTRIC MOTOR

[72] Inventor: John C. Widstrand, Wausau, Wis.
[73] Assignee: Marathon Electric Manufacturing Corporation, Wausau, Wis.
[22] Filed: April 26, 1971
[21] Appl. No.: 137,268

[52] U.S. Cl. ...................................310/216, 310/254
[51] Int. Cl. ..............................................H02k 1/26
[58] Field of Search ..........310/42, 198, 216–218, 310/254, 258–259, 89, 260

[56] References Cited

UNITED STATES PATENTS

| | | | |
|---|---|---|---|
| 792,762 | 6/1905 | Dynn | 310/254 |
| 3,343,013 | 9/1967 | Wightman et al. | 310/42 |
| 2,795,712 | 6/1957 | Suhr | 310/198 |
| 2,812,459 | 11/1957 | Smith | 310/216 X |
| 3,437,853 | 4/1969 | Arnold | 310/4 |
| 3,161,794 | 12/1964 | Lindgren | 310/89 |

Primary Examiner—D. F. Duggan
Attorney—Ira Milton Jones

[57] ABSTRACT

A two-pole induction-run motor can have asymmetrical poles at opposite sides of a horizontal plane on its axis. All stator core laminations are identical, generally octogonal in outline, with straight, parallel top and bottom edges, straight side edges, and intermediate edge portions curved on a uniform radius about the motor axis. The end bells have uniplanar shoulders, normal to the bearing axis, that engage the flat end surfaces of the stator core and have axially inward tongue-like projections that snugly engage the rounded surfaces on the stator core for end bell and bearing coaxiality.

8 Claims, 4 Drawing Figures

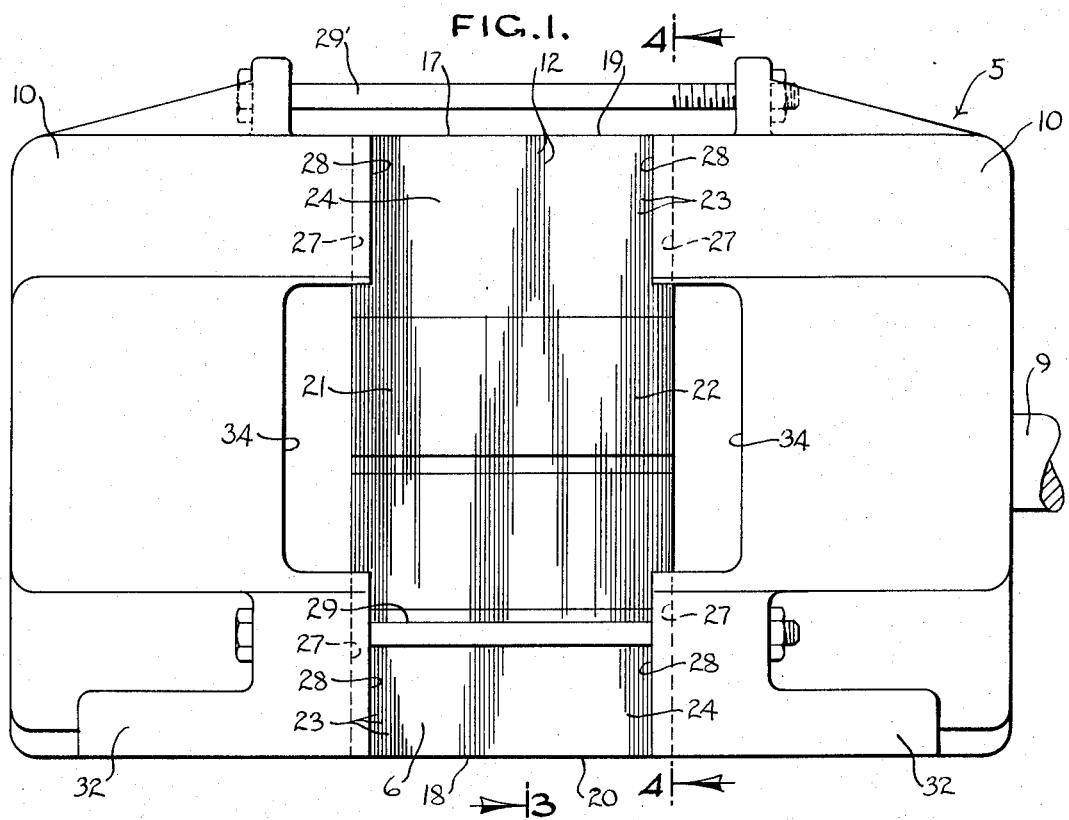
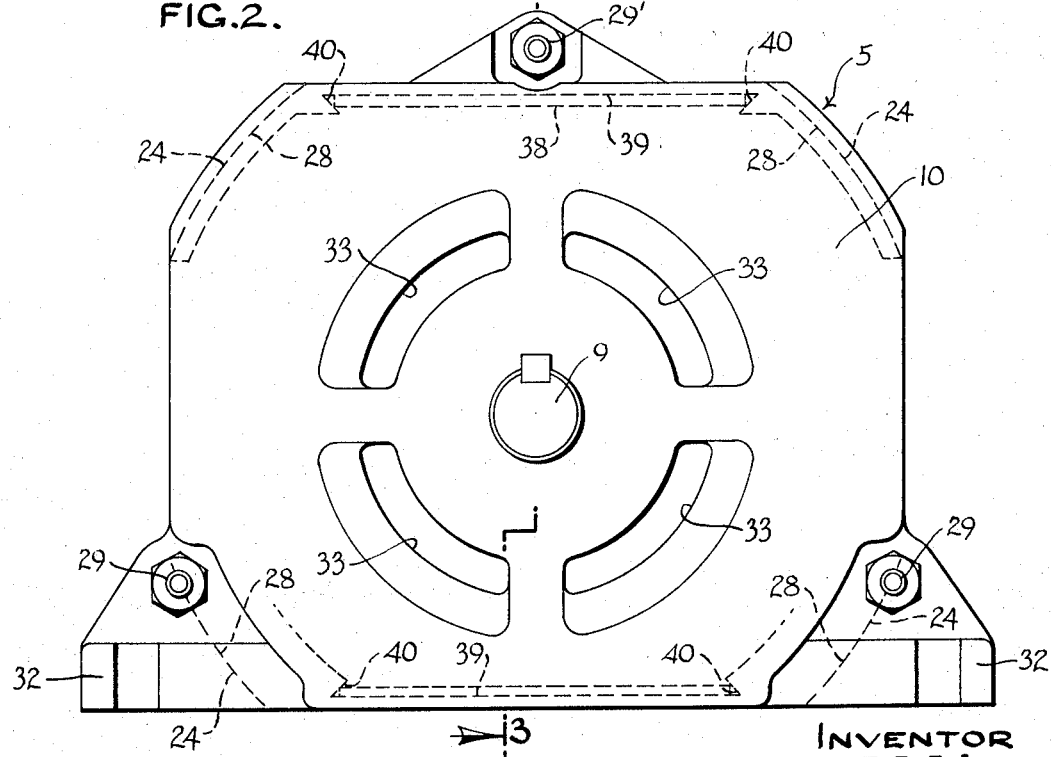

INVENTOR
John C. Widstrand
BY
ATTORNEY

LOW-SHAFT, LOW-PROFILE ELECTRIC MOTOR

This invention relates to dynamo-electric machines, and more particularly to an electric motor which is intended to be energized by alternating current and which, for its power and torque, is unusually low in both shaft height and over all height.

In some electric motor applications low shaft height and low profile are of critical importance. For example, a motor intended to provide a direct drive for a circular saw must fit below the table and must be so dimensioned that a substantial portion of the saw blade projects above the table.

With this in mind it is the general object of this invention to provide an electric motor which has an unusually low profile and shaft height relative to its horsepower, has high torque, can be manufactured at low cost, and can be assembled very quickly and easily without special fixtures or other equipment.

A more specific object of this invention is to provide a low-profile, low-shaft-height electric motor having no frame in the conventional sense, but instead having end bells directly attached to a stator core consisting of a stack of identical laminations, and wherein the end bells are self-aligning with respect to the stator core without the need for machining of the core and with little or no machining on the end bells.

Another specific object of this invention is to provide a low-profile electric motor in which the bottom surface of the motor is in part defined by a flat surface on the stack of laminations comprising the stator core and on which there are readily accessible mounting feet that have their bottom surfaces coplanar with said flat surface.

It is also an object of this invention to provide an electric motor that achieves low shaft height by reason of an asymmetrical stator.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of an embodiment of the invention constructed according to the best mode so far devised for the practical application of the principles thereof, and in which:

FIG. 1 is a view in side elevation of a motor embodying the principles of this invention;

FIG. 2 is an end view of the motor shown in FIG. 1;

Figure 3:
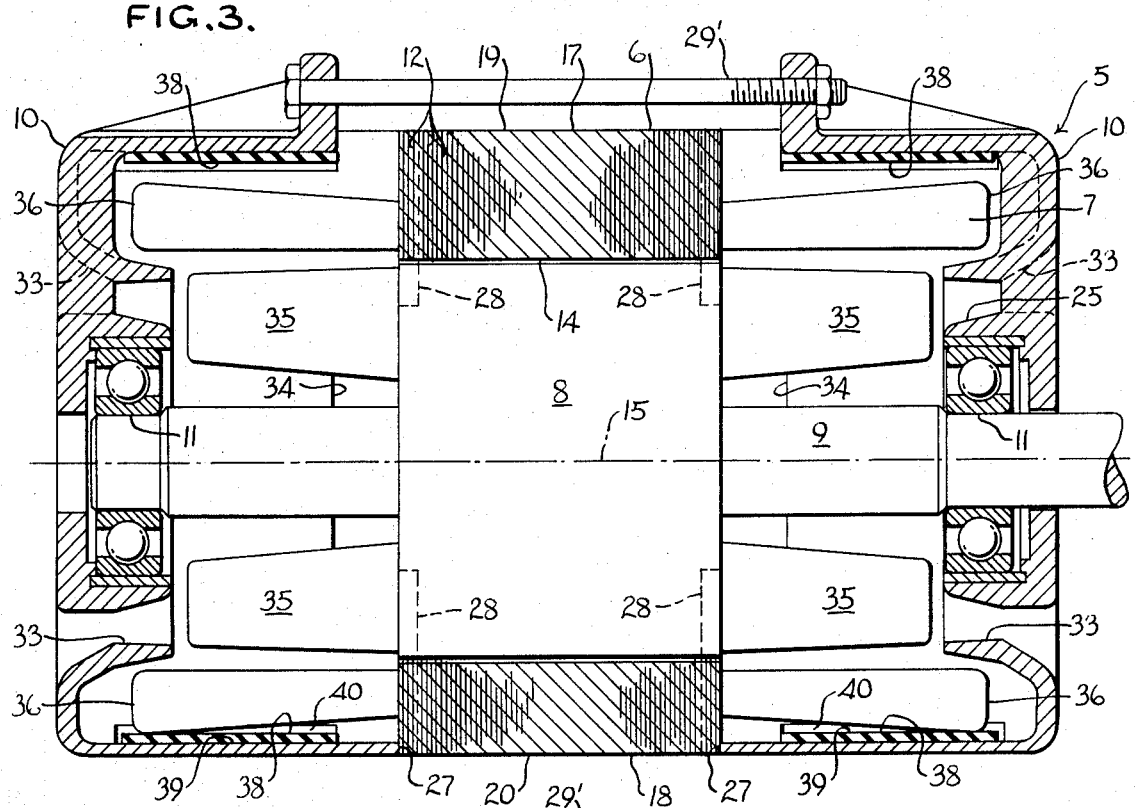
FIG. 3 is a view in longitudinal section taken on the plane of the line 3—3 in FIG. 2.
Figure 4:
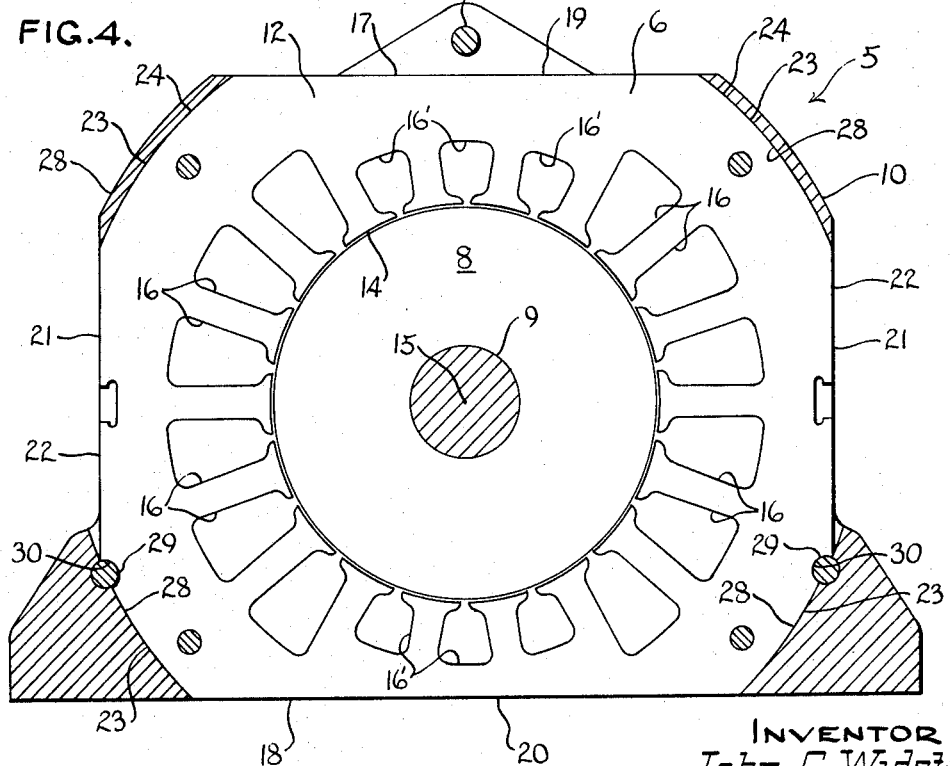
FIG. 4 is a view in cross section taken on the plane of the line 4—4 in FIG. 1.

Referring now more particularly to the accompanying drawings, the numeral 5 designates generally an electric motor embodying the principles of this invention and comprising, in general, a laminated stator core 6 on which there are windings 7, a rotor 8 having a shaft 9, and a pair of end bells 10 that carry bearings 11 in which the rotor shaft is journalled.

The motor 5 is adapted to be energized with alternating current and is of the capacitor-start induction-run type. The necessary capacitor for the motor, and a current responsive relay by which the capacitor is switched into the winding circuit for starting and cut out for running, can be mounted remotely from the motor and hence are not shown.

The motor of this invention does not have the customary frame. Instead, the end bells 10 are secured directly to the laminated stator core 6, and the end bells and stator core together define the external surfaces of the motor. Furthermore, the finished stator core is not machined in any way for cooperation with the end bells. All of the laminations 12 that are stacked to comprise the stator core are identical with one another, both before their assembly into the stack and in the finished motor. The motor of this invention is further unusual in that its stator core can by asymmetrical to the motor axis.

Each of the laminations 12 comprising the stator core is generally octagonal in outline and has an inner circular opening 14. When the laminations are flatwise stacked to form the core, their openings 14 register with one another to define a bore in which the rotor 8 is received. The axis of the circular opening, which is designated by 15, of course coincides with the rotor axis. Slots 16 for the stator windings 7 open radially inwardly to the circular opening 14 at circumferentially spaced intervals around it, as is conventional in induction motor stator cores. However, the three uppermost winding slots and the three lowermost ones, all designated by 16', are of substantially lesser radial depth than the remaining slots, since they receive only starting windings, as explained hereinafter.

Each lamination has straight top and bottom edges 17 and 18, respectively, but, as shown, the bottom edge 18 can be spaced from the axis 15 by a smaller distance than the top edge 17 for installations where shaft height is very critical and high torque is needed. When the laminations are assembled, these straight edges provide flat top and bottom surfaces 19 and 20 on the stator core that are parallel to one another and to the motor axis.

Each lamination also has a pair of straight side edges 21 which are perpendicular to the top and bottom edges 17 and 18, and which of course define flat side surfaces 22 on the core. The side edges can be spaced a greater distance from the axis 15 than the top edge 17.

Connecting the several straight edge portions 17, 18, and 21 on each lamination and defining the remaining sides of its octagonal outline, are edge portions 23 that are curved on a uniform radius about the axis 15 so as to represent segments of a circle concentric with the opening 14.

The flatwise stacked laminations can be secured together by means of rivets 31, or in any other desired manner.

Each of the end bells 10 is generally cup-shaped, and is preferably made as a precision die casting. As viewed from the ends of the motor the end bells are substantially octagonal in outline, being generally similar in size and shape to the stator core laminations, with flat top, bottom and side surfaces connected by curved surfaces of uniform radius that are concentric to the motor axis.

In its end wall each end bell has a concentric inwardly projecting hub-like portion 25 in which a bearing 11 for the rotor shaft 9 is seated. It is imperative that the bearings be coaxial in the assembled motor, and that their axis coincide with that of the stator core. To that end the side wall of each end bell has at its rim uniplanar, axially inwardly facing surface portions or shoulders 27 which are accurately normal to the bearing axis and which engage the adjacent flat end surface of the lamination stack, and the end bell also has tongue-like or flange-like projections 28 which extend axially inwardly beyond the shoulders 27 and engage around the curved surface portions 24 on the core. The surface portions 24 on the core, defined by the edges 23 on the laminations, are accurately concentric to the axis 15 and are closely fitted by the radially inner surfaces of the tongue-like projections 28, which can be made accurately concentric to the bearing seats 25 either by machining or by precision die casting of the end bells. Hence mere assembly of the end bells to the core assures concentricity of the bearings, rotor and core.

The end bells are secured in fixed relation to one another and to the stator core by means of over bolts 29 which extend parallel to the motor axis through holes in the end bells and along the curved surfaces 24 on the core. Preferably these over bolts are partway received in grooves 30 in the core that open radially outwardly to said curved surfaces. An additional over bolt 29' can extend along the top surface 19 of the core if overall motor height limitations permit.

The flat bottom surface of the end bells is coplanar with the bottom surface of the stator core; hence the shaft height of the motor is defined by the distance from the axis 15 to the bottom edge 18 of a stator lamination. Mounting feet 32 can be formed integrally with the end bells, projecting sidewardly from the lower rounded side wall portions of the end bells and having their bottom surfaces coplanar with the bottom surfaces of the end bells and core.

For motor cooling, the end wall of each end bell has concentric arcuate slots 33 therethrough, and portions of the rim of its side wall are notched to be spaced from the adjacent flat end surface of the core and thus define cooling slots 34 in the sides of the motor. The rotor is provided with axially projecting vanes 35 on each end thereof to circulate cooling air through the slots 33 and 34.

The motor of this invention is preferably a two pole motor, having its running poles at opposite sides of a horizontal plane through the motor axis. In the asymmetrical embodiment here illustrated, the core has less metal below this plane than above it. With a two pole motor the resultant magnetic unbalance of the poles causes no significant adverse effects upon motor performance. In fact, the additional metal and space in the upper portion of the core can be utilized to obtain increased torque and power by further increasing the asymmetry of the poles with the use of wire for the upper pole windings that has a heavier gage than the wire used for the windings of the lower pole. It is also possible to utilize the asymmetry of the running poles to minimize cost of the motor, as by employing aluminum wire for the upper windings at times when aluminum wire is cheaper than copper.

Those skilled in the art will recognize that other compromises are possible with the use of two asymmetrical poles, as for example the employment of cheaper insulation and magnet wire coatings for the upper windings, which are subjected to lesser magnetic densities than the lower ones and which can be subjected to lower maximum temperatures for a given current density owing to their larger available winding envelope size.

It will be observed that the starting windings, which define poles that are geometrically displaced 90° from the running windings, are symmetrical to one another inasmuch as they are at opposite sides of the vertical plane of symmetry through the motor axis. Note that with the herein disclosed orientation of the poles, only a relatively small number of strands of wire, all of which comprise starting windings, need to be accommodated in the three uppermost slots and the three lowermost slots, so that these slots 16' can be radially quite shallow, consistently with the requirement for minimum core metal in the height dimension.

In order to achieve minimum shaft height and very low overall height, the winding end turns 35 must come very close to the top and bottom inside surfaces of the end bells. However, the winding strands should not come into contact with the metal of the end bells because of the possible danger of short circuiting the motor by grounding of the windings. With this in mind, plate-like insulating barriers 38 are provided between the end turns of the windings and the flat top and bottom inner wall surfaces of each end bell. Each of these barriers can comprise a stiff but slightly flexible rectangle of an insulating material such as fiber, having opposite edge portions snugly received in closely fitting slots 39 in the end bell. The slots, which extend lengthwise parallel to the motor axis, are formed in the end bell inwardly adjacent to its flat top and bottom walls and open laterally toward one another along their lengths and inwardly towards the core at their ends. The opposing surfaces 40 of each cooperating pair of slots are inclined to one another and converge radially inwardly, so that the two slots hold the barrier plate with a snug fit and wedgingly urge it flatwise towards its adjacent end bell surface. Each barrier is thus readily installed by sliding it lengthwise into the pair of slots intended to receive it, in the axially outward direction relative to the end bell.

Since the motor of this invention has no brushes, its assembly is an extremely simple procedure. The bearings 11 and insulating barriers 38 are fitted into the end bells, and with the rotor in place in the bore in the stator core, the end bells are fitted onto the stack of stator core laminations. No alignment devices need be inserted between the rotor and the inside diameter of the stator core, and the end bells are self-aligning on the stator core as explained above. Hence the assembly is concluded by insertion and securement of the over bolts 29 and 29'.

From the foregoing description taken with the accompanying drawings it will be apparent that this invention provides a motor that has both a low shaft height and a low over all height for its power. It will also be apparent that the motor of this invention is inexpensive to manufacture and can be quickly and easily assembled without the need for special jigs, fixtures or other tools.

Those skilled in the art will appreciate that the invention can be embodied in forms other than as herein disclosed for purposes of illustration.

The invention is defined by the following claims:

1. An electric motor having a pair of end bells which carry coaxial bearings for the shaft of the rotor and which are located at opposite ends of a generally annular stator core comprising flatwise stacked laminations upon which there are windings and within which the rotor coaxially turns, said motor being characterized by:
   A. all of the laminations of the stator core being substantially identical with one another and of such shape that the exterior of the core has opposite flat top and bottom surfaces which are parallel to the rotor axis and to one another, and has other surface portions which are curved on a uniform radius about said axis;
   B. each of the end bells having uniplanar surface portions normal to said axis that flatwise engage the surface of its adjacent endmost lamination of the core;
   C. each of the end bells having tongue-like axially inward projections that closely overlie said other surface portions on the core to maintain coaxiality between the core and the end bells;
   D. each of the end bells having a flat bottom wall, the bottom surface of which is coplanar with said bottom surface on the core;
   E. each of the end bells having mounting feet projecting laterally to opposite sides thereof, said mounting feet having their bottom surfaces coplanar with said bottom surface on the end bell; and
   F. means securing each end bell against axially outward and rotational displacement relative to the core.

2. The electric motor of claim 1, further characterized by:
   G. said motor being a two pole motor, the windings defining one of its poles being located above a horizontal plane through said axis and the windings defining its other pole being located below said plane; and
   H. the bottom surface of the core being spaced a lesser distance from said axis than its top surface.

3. The motor of claim 1, further characterized by:
   G. each of the end bells having in its interior a pair of grooves that are adjacent to its bottom wall and lengthwise parallel to said axis, said grooves opening along their lengths laterally towards one another and opening endwise axially inwardly; and
   H. a plate-like barrier member of insulating material overlying the bottom wall of the end bell and having opposite edge portions received in said grooves to be confined against displacement by them, said plate-like member preventing grounding contact between the metal of the end bell and end turns of windings in the bottom portion of the core.

4. The motor of claim 3, further characterized by:
   said grooves having substantially opposing surfaces that are oblique to one another and which converge in the direction towards said axis.

5. An induction-run motor having a wound stator comprising a core of flatwise stacked laminations and a pair of end bells secured at opposite ends of the stator core and which carry coaxial bearings in which are journalled the shaft of a rotor that rotates in the stator core, said motor being characterized by:

A. all of the laminations comprising the stator core being identical, and each having
  1. a circular opening in which the rotor is concentrically received,
  2. straight, parallel top and bottom edges, and
  3. other edge portions curved on a uniform radius concentric to the axis of said circular opening;
B. each of the end bells being generally cup-shaped and having coplanar surface portions on its rim that face axially inwardly and flatwise engage the surface of its adjacent endmost lamination of the stator core to establish the axial position of the end bell;
C. each of the end bells having tongue-like axially inward projections that closely engage around said other edge portions of the end laminations of the stator core to establish the end bell with its bearing coaxial to said opening in the laminations; and
D. each end bell having a bottom surface that is flat and coplanar with the bottom edges of the laminations.

6. The motor of claim 5 wherein each lamination has circumferentially spaced slots opening radially inwardly to said circular opening, in which core windings are received, further characterized by:
  E. the running poles of the motor being located at opposite sides of a horizontal plane lying on the rotor axis;
  F. the starting poles of the motor being located at opposite sides of a vertical plane lying on the rotor axis; and
  G. those of said slots that are adjacent to said vertical plane being of lesser radial depth than the remainder of said slots, and containing only windings associated with the starting poles.

7. The motor of claim 6, further characterized by:
H. the straight bottom edge of each lamination being spaced a smaller distance from the center of the circular opening than the straight top edge thereof.

8. The motor of claim 7, further characterized by:
the winding associated with the upper running pole being of heavier gage wire than the winding associated with the lower running pole.

* * * * *